(12) United States Patent
Da Palma et al.

(10) Patent No.: US 7,890,333 B2
(45) Date of Patent: Feb. 15, 2011

(54) USING A WIKI EDITOR TO CREATE SPEECH-ENABLED APPLICATIONS

(75) Inventors: William V. Da Palma, Coconut Creek, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 11/766,002

(22) Filed: Jun. 20, 2007

(65) Prior Publication Data

US 2008/0319762 A1 Dec. 25, 2008

Related U.S. Application Data

(63) Continuation-in-part of application No. 11/765,900, filed on Jun. 20, 2007, and a continuation-in-part of application No. 11/765,928, filed on Jun. 20, 2007, and a continuation-in-part of application No. 11/765,962, filed on Jun. 20, 2007.

(51) Int. Cl.
*G10L 15/22* (2006.01)

(52) U.S. Cl. .................................. 704/270.1

(58) Field of Classification Search ............... 704/270, 704/270.1
See application file for complete search history.

(56) References Cited

U.S. PATENT DOCUMENTS

| | | | |
|---|---|---|---|
| 6,314,402 | B1 | 11/2001 | Monaco et al. |
| 6,324,511 | B1 | 11/2001 | Kiraly et al. |
| 6,442,577 | B1 | 8/2002 | Britton et al. |
| 6,636,831 | B1 | 10/2003 | Profit, Jr. et al. |

(Continued)

FOREIGN PATENT DOCUMENTS

WO 2005011921 12/2005

OTHER PUBLICATIONS

Takami et al.; A study on the architecture and voice dialog scheme for a personal Web service in a ubiquitous communication environment; IEEE, Jun. 2006; pp. 398-401.*

(Continued)

*Primary Examiner* — Abul Azad
(74) *Attorney, Agent, or Firm* — Patents on Demand, P.A.; Brian K. Buchheit; Scott M. Garrett

(57) ABSTRACT

The present invention discloses a system and a method for creating and editing speech-enabled WIKIs. A WIKI editor can be served to client-side Web browsers so that end-users can utilize WIKI editor functions, which include functions to create and edit speech-enabled WIKI applications. A WIKI server can serve speech-enabled WIKI applications created via the WIKI editor. Each of the speech-enabled WIKI applications can include a link to at least one speech processing engine located in a speech processing system remote from the WIKI server. The speech processing engine can provide a speech processing capability for the speech-enabled WIKI application when served by the WIKI server. In one embodiment, the speech-enabled applications can include an introspection document, an entry collection of documents, and a resource collection of documents in accordance with standards specified by an ATOM PUBLISHING PROTOCOL (APP).

18 Claims, 6 Drawing Sheets

U.S. PATENT DOCUMENTS

| | | |
|---|---|---|
| 6,801,604 B2 | 10/2004 | Maes et al. |
| 6,865,599 B2 | 3/2005 | Zhang |
| 7,143,148 B1 | 11/2006 | Hickman et al. |
| 7,334,050 B2 | 2/2008 | Zondervan et al. |
| 7,581,166 B2 | 8/2009 | Renger et al. |
| 7,631,104 B2 * | 12/2009 | Da Palma et al. ............ 709/246 |
| 7,673,017 B2 | 3/2010 | Kim et al. |
| 2002/0010756 A1 | 1/2002 | Oku |
| 2002/0052747 A1 * | 5/2002 | Sarukkai ..................... 704/270 |
| 2003/0055884 A1 | 3/2003 | Yuen et al. |
| 2003/0088421 A1 | 5/2003 | Maes et al. |
| 2003/0139928 A1 | 7/2003 | Krupatkin et al. |
| 2003/0177010 A1 | 9/2003 | Locke |
| 2005/0132056 A1 | 6/2005 | Creamer et al. |
| 2006/0004700 A1 | 1/2006 | Spivak et al. |
| 2006/0015335 A1 | 1/2006 | Vennelakanti et al. |
| 2006/0195328 A1 | 8/2006 | Abraham et al. |
| 2007/0078884 A1 * | 4/2007 | Ott et al. ..................... 707/102 |
| 2008/0086689 A1 | 4/2008 | Berkley et al. |
| 2008/0242221 A1 | 10/2008 | Shapiro et al. |
| 2008/0319742 A1 | 12/2008 | Da Palma et al. |
| 2008/0319757 A1 | 12/2008 | Da Palma et al. |
| 2008/0319758 A1 | 12/2008 | Da Palma et al. |
| 2008/0319759 A1 | 12/2008 | Da Palma et al. |
| 2008/0319760 A1 | 12/2008 | Da Palma et al. |
| 2008/0319761 A1 | 12/2008 | Da Palma et al. |
| 2008/0320079 A1 | 12/2008 | Da Palma et al. |
| 2008/0320443 A1 | 12/2008 | Da Palma et al. |

OTHER PUBLICATIONS

Schaffert; IkeWiki: A Semantic Wiki for Collaborative Knowledge Management; Proceedings of the 15$^{th}$ IEEE International Workshops on Enabling Technologies: Infrastructure for Collaborative Enterprises, 2006.*

Kolias et al.; A persive Wiki application based on VoiceXML; ACM, PETRA '08, Jul. 15-19, 2008, Athens, Greece.*

Huang, C.M., et al., "Phone-Web: Accessing WWW using a telephone set", World Wide Web, vol. 2, No. 3, pp. 161-178, 1999.

Freier, J., et al., "WebViews: Accessing Personalized Web Content and Services", Proc. of 10th Int'l Conf. on WWW, Hong Kong, pp. 576-586, 2001.

Goose, S., et al., "Streaming speech3: a framework for generating and streaming 3D text-to-speech and audio presentations to wireless PDAs as specified using extensions to SMIL", Proc. of 11th Int'l. Conf. on WWW, Honolulu, HI, pp. 37-44, 2002.

Jieun, P., et al., "Conversational browser for accessing VoiceXML-based IVR services via multi-modal interactions on mobile devices", WSEAS Trans. on Computers, vol. 3, No. 1, pp. 85-91, Jan. 2004.

Capra III, R.G. et al., "Mobile refinding of web information using a voice interface: an exploratory study", Proc. of 2005 Latin American Conf. on Human-computer interaction, Cuernavaca, Mexico, pp. 88-99, 2005.

Chang, S.E. et al., "The implementation of a secure and pervasive multimodal Web system architecture", Inf. and Software Tech., vol. 48, No. 6, pp. 424-432, Jun. 2006.

Fielding, R. et al., "Hypertext Transfer Protocol—HTTP/1.1," [online] Internet RFC 2616, The Internet Society, 1999, [retrieved Jul. 22, 2009] retrieved from the Internet: <http://www.w3.org/Protocols/rfc2616/rfc2616.html>.

O'Reilly, T., "What is Web 2.0," [online] O'Reilly Network, Sep. 30, 2005, [retrieved Nov. 25, 2008] retrieved from the Internet <http://www.oreillynet.com/pub/a/oreilly/tim/news/2005/09/30/what-is-web-20.html>.

"BLIKI", [online] Wikipedia [retrieved Feb. 23, 2007] retrieved from the Internet: <http://en.wikipedia.org/wiki/Bliki>.

"Cyn.in," [online] Cynapse [retrieved Feb. 23, 2007] retrieved from the Internet: <http://www.cynapse.com/cynin>.

DeMaria, M.J., "Searching for the Right Words", Network Computing, vol. 17, No. 22, pp. 26, 28, Oct. 26, 2006.

"Enterprise Bliki," [online] Wikipedia, [retrieved Feb. 23, 2007] retrieved from the Internet: http://en.wikipedia.org/wiki/Enterprise_bliki>.

Fielding, R., et al., "Principled Design of the Modern Web Architecture," ACM Trans. On Internet Technology, vol. 2, No. 2, May 2002, pp. 115-150.

Leseney, T., "Push-to-blog", Siemens AG, Oct. 2004.

Nottingham, M., et al., "Request for Comments (RFC) 4287: The Atom Syndication Format," The Internet Society, Dec. 2005, 43 pages.

"SuiteTwo: Features", [online] Moveable Type, 2006 [retrieved Feb. 23, 2007] retrieved from the Internet: <http://suitetwo.com/features>.

" Wiki," [online] Wikipedia [retrieved Feb. 23, 2007] retrieved from the Internet: <http://en.wikipedia.org/wiki/Wiki>.

US Pub. No. 20080319758, Office Action 1, Jun. 9, 2010.

US Pub. No. 20080320079, Office Action 1, Jun. 30, 2010.

US Pub. No. 20080319760, Office Action 1, Jul. 12, 2010.

* cited by examiner

USING A WIKI EDITOR TO CREATE SPEECH-ENABLED APPLICATIONS

CROSS-REFERENCE TO RELATED APPLICATIONS

This continuation-in-part application claims the benefit of U.S. patent application Ser. No. 11/765,900 filed Jun. 20, 2007, the benefit of U.S. patent application Ser. No. 11/765,928 filed Jun. 20, 2007, and the benefit of U.S. patent application Ser. No. 11/765,962 filed Jun. 20, 2007, which are incorporated by reference herein.

BACKGROUND

1. Field of the Invention

The present invention relates to the field of WIKI creation and editing and, more particularly, to using a WIKI editor to create speech-enabled applications.

2. Description of the Related Art

A WIKI is a collaborative web application that allows end users to add and edit content. A WIKI application refers to a collection of WIKI pages written in a markup language that are interconnected via hyperlinks. WIKIs are served by a WIKI server to standard Web browsers which function as WIKI clients. A WIKI server can also serve a special Web page that is a WIKI editor, where users add and edit content. Some WIKI sites permit WIKI content to be written in accordance with a WIKI syntax, such as having special characters to indicate hyperlinked content, bulleted content, and the like. WIKI syntax is generally designed to be more intuitive for end-users to utilize than standard markup languages.

Conventional WIKIs do not incorporate speech processing technologies. Such technologies can require a WIKI server or WIKI pages to be integrated with a server-side speech processing system. Traditional interface mechanisms to these speech processing systems rely upon specialized voice toolkits, such as IBM's WEBSPHERE VOICE SERVER (WVS) voice toolkit. Use of these toolkits requires some knowledge of speech processing technologies that is beyond a proficiency of most end-users and even many programmers. Since end-users are content providers of WIKI applications, this effectively prevents WIKI applications from utilizing speech processing technologies.

SUMMARY OF THE INVENTION

The present invention discloses a WIKI editor for building speech-enabled applications. The WIKI editor can be served as Web pages to clients that include Web browsers which render the WIKI editor for users of the client. In one embodiment, an extended WIKI syntax for voice can be used to specify speech-processing elements. Standard buttons and functions of the WIKI editor can be overloaded for speech processing capabilities. For example, a preview button of the WIKI editor can be overloaded to render voice markup and/or voice syntax so that users can test their speech-enabled applications directly from their Web browser. In another embodiment, standard WIKI syntax can dynamically transform normal WIKI syntax for HTML into VoiceXML at runtime using associated transformation style sheets. In still another embodiment, the WIKI editor can include a graphical user interface (GUI) development tool for voice capable of creating graphical call flows using visual development tools.

A number of advantages are inherent in utilizing the Web 2.0 WIKI editor approach to build speech-enabled applications over using standard development tools and approaches. The disclosed WIKI editor, for example, automatically facilitates concurrent development in the same application (a speech-enabled application includes multiple linked WIKI entries/pages). Different people potentially located remotely from each other can edit the same speech-enabled application at the same time. The speech-enabled application being edited/developed using the disclosed WIKI editor can be live applications, where a developer can be permitted to preview changes on-line before saving them. Further, the disclosed WIKI editor can have a standard WIKI editor look/feel, which minimizes developer training time and which makes it easy for developers to intuitively construct speech-enabled applications using different WIKI editors associated with different WIKI servers.

The present invention can be implemented in accordance with numerous aspects consistent with the material presented herein. For example, one aspect of the present invention can include a system for creating and editing speech-enabled WIKIs including a WIKI editor and a WIKI server. The WIKI editor can be served to client-side Web browsers so that end-users can utilize WIKI editor functions, which include functions to create and edit speech-enabled WIKI applications. The WIKI server can serve speech-enabled WIKI applications created via the WIKI editor. Each of the speech-enabled WIKI applications can include a link to at least one speech processing engine located in a speech processing system remote from the WIKI server. The speech processing engine can provide a speech processing capability for the speech-enabled WIKI application when served by the WIKI server. In one embodiment, the speech-enabled applications can include an introspection document, an entry collection of documents, and a resource collection of documents in accordance with standards specified by an ATOM PUBLISHING PROTOCOL (APP).

Another aspect of the present invention can include a method of creating and editing speech-enabled WIKIs. In the method, a WIKI editor can be accessed from a client interface. Input can be accepted via the client interface. This input can be processed to create content for a speech-enabled WIKI entry which can be saved in a data store accessible by a WIKI server. The WIKI entry can establish a link with at least one speech processing engine located in a speech processing system remote from the WIKI server. The speech processing engine can provide a speech processing capability for the WIKI entry when served by the WIKI server.

Still another aspect of the present invention can include a method for developing speech-enabled applications. The method can include a step of presenting a WIKI editor to an end-user via a Web browser. WIKI syntax can be received from the end-user through the WIKI editor. The WIKI syntax can be transformed into a voice markup language format, such as VoiceXML, to create a speech-enabled application. The speech-enabled application can be served to at least one WIKI client.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 2, which includes

DETAILED DESCRIPTION OF THE INVENTION

Figure 1:
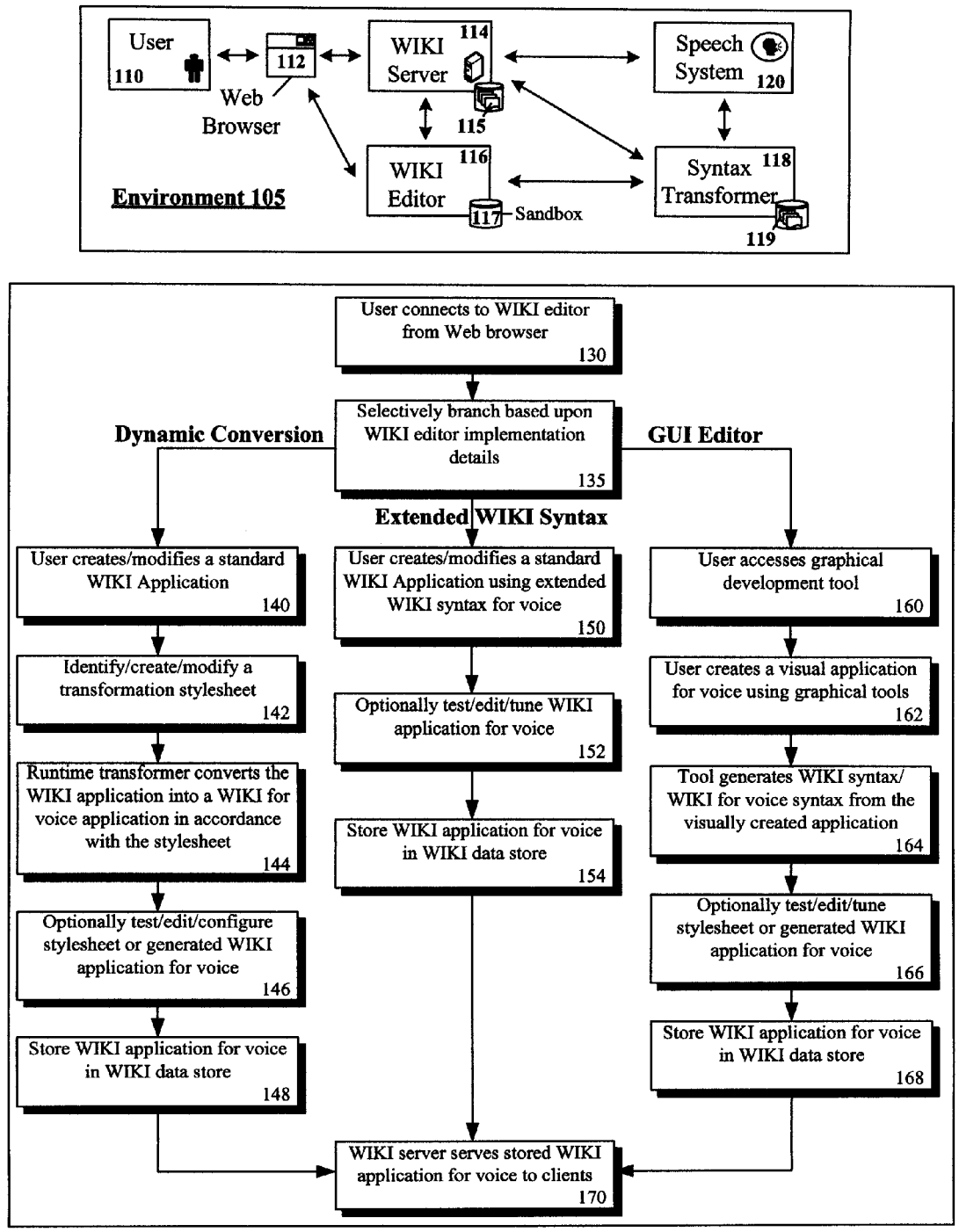
FIG. 1 is a flow diagram illustrating an environment for creating and editing speech-enabled applications using a WIKI editor in accordance with an embodiment of the inventive arrangements disclosed herein.

FIG. 1 is a flow diagram illustrating an environment for creating and editing speech-enabled applications 115 using a WIKI editor 116 in accordance with an embodiment of the inventive arrangements disclosed herein. Each of the speech-enabled applications 115 can be written in accordance with Representational State Transfer architecture (REST) principles. For example, the application 115 can conform to the ATOM PUBLISHING PROTOCOL (APP). Moreover, each speech-enabled application 115 can be associated with an introspection document and a collection of entries and resources. The resources can link the WIKI server 114 to speech processing engines of speech system 120. End users 110 of environment 105 can be permitted to introspect, customize, add, re-order, and remove entries and resources of the collections via an interface 112 to editor 116. The interface 112 can be a standard Web browser.

In one embodiment, a syntax transformer 118 can utilize a set of style sheets 119 to convert normal WIKI syntax to a speech-enabled syntax, such as a VoiceXML syntax. In another embodiment, a sandbox 117 can exist that permits the user 110 to work on the application 115 in a non-live computing space, which others are unable to access. There are no assumptions regarding the clients that access applications 115 served by server 114 other than an ability to communicate with the WIKI server 114 using standard WIKI protocols.

The speech system 120 can be a network accessible system of speech processing resources. The system 120 can be a turn-based speech system, which provides speech recognition, speech synthesis, speaker identification and verification, and other speech processing services. In one embodiment, the speech system 120 can be an implementation of IBM's WEB-SPHERE VOICE SERVER, although the invention is not limited in this regard. The speech processing engines of system 120 can be accessed through a set of RESTful commands, such as GET, PUT, POST, and/or DELETE.

The method of FIG. 1, which includes steps 130-170, can be performed in the context of environment 105. The method can begin in step 130, where a user of a Web browser can connect to the WIKI editor 116. Step 135 shows that the method selectively branches based upon WIKI editor 116 implementation details. In different embodiments, the WIKI editor 116 can dynamically convert normal WIKI syntax to a speech-enabled syntax, can include an enhanced WIKI syntax that has been extended for voice, and can include a software development tool for graphically creating speech-enabled applications. These implementation mechanisms are used to illustrate that speech-enabled applications can be constructed from a server-side WIKI editor 116 in various ways. The disclosed invention is not to be limited in this regard.

When the WIKI editor dynamically converts normal WIKI syntax to voice syntax, the method can proceed from step 135 to steps 140-148. In step 140, a user can create/modify a standard WIKI application 140. In step 142, an associated transformation style sheet can be identified, created, and/or modified by the user. In step 144, a runtime transformer (118) can convert the WIKI application into a WIKI for voice application in accordance with details specified by the style sheet. In step 146, the user can optionally test, edit, or otherwise configure the style sheet, the standard WIKI application, and/or the generated WIKI application for voice. In step 148, the WIKI for voice application can be stored in a WIKI data store accessible by a WIKI server (114). In subsequent step 170, the WIKI server can serve the stored WIKI application for voice to clients.

When the WIKI editor supports an extended WIKI syntax that has been extended for voice, the method can proceed from step 135 to steps 150-154. In step 150, the user can create or modify a WIKI application using WIKI syntax that has been extended for voice. In step 152, a created WIKI application for voice can be optionally tested, edited, and/or tuned using a WIKI editor. In step 154, the WIKI application can be stored. The stored application can be served by a WIKI server in step 170.

When the WIKI editor includes a GUI software development tool for visually constructing speech-enabled applications, the method can proceed from step 135 to steps 160-168. In step 160, a user can access a graphical development tool. In step 162, the user can visually model a speech-enabled WIKI using the graphical development tool. In step 164, the tool can generate WIKI syntax extended for voice, WIKI for voice markup, VoiceXML markup, and the like. In optional step 166, the user can optionally edit, test, and/or tune application specifics. In step 168, the WIKI application for voice can be stored, where it is served by a WIKI server in subsequent step 170.

Figure 2A:
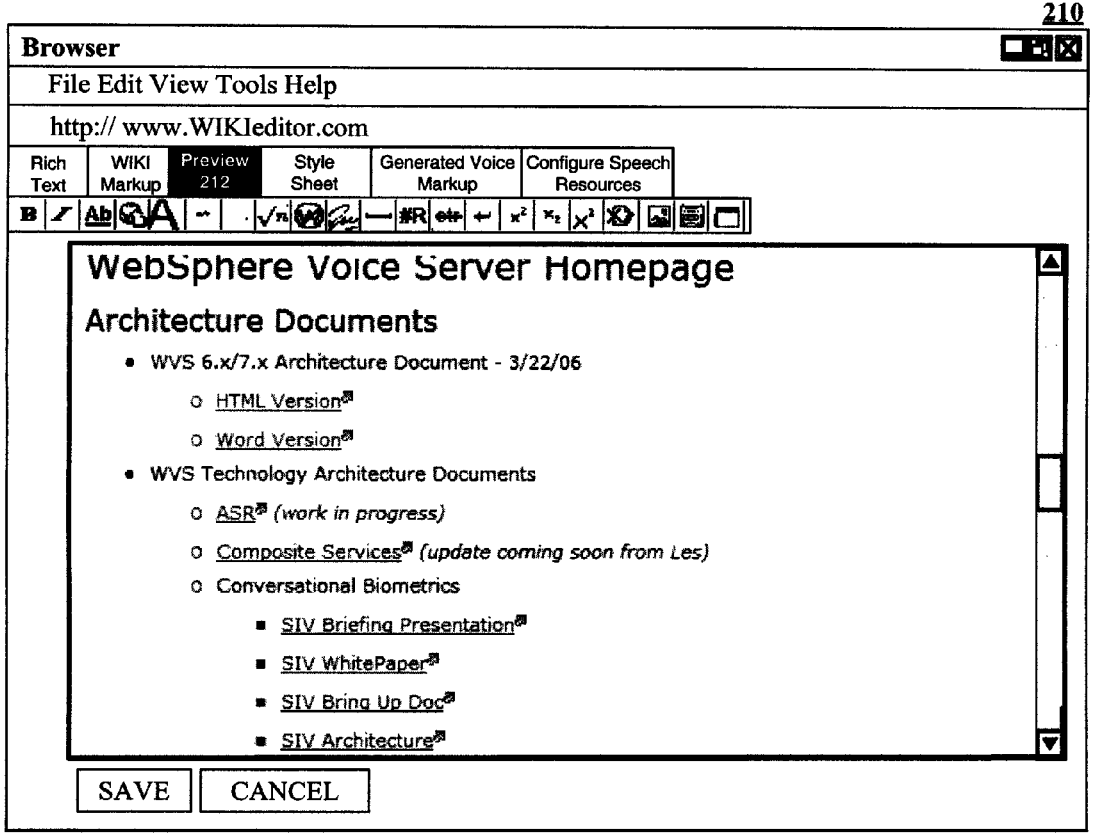
FIG. 2A and FIG. 2B, illustrates a WIKI editor for constructing speech-enabled applications in accordance with an embodiment of the inventive arrangements disclosed herein.
Figure 2A:
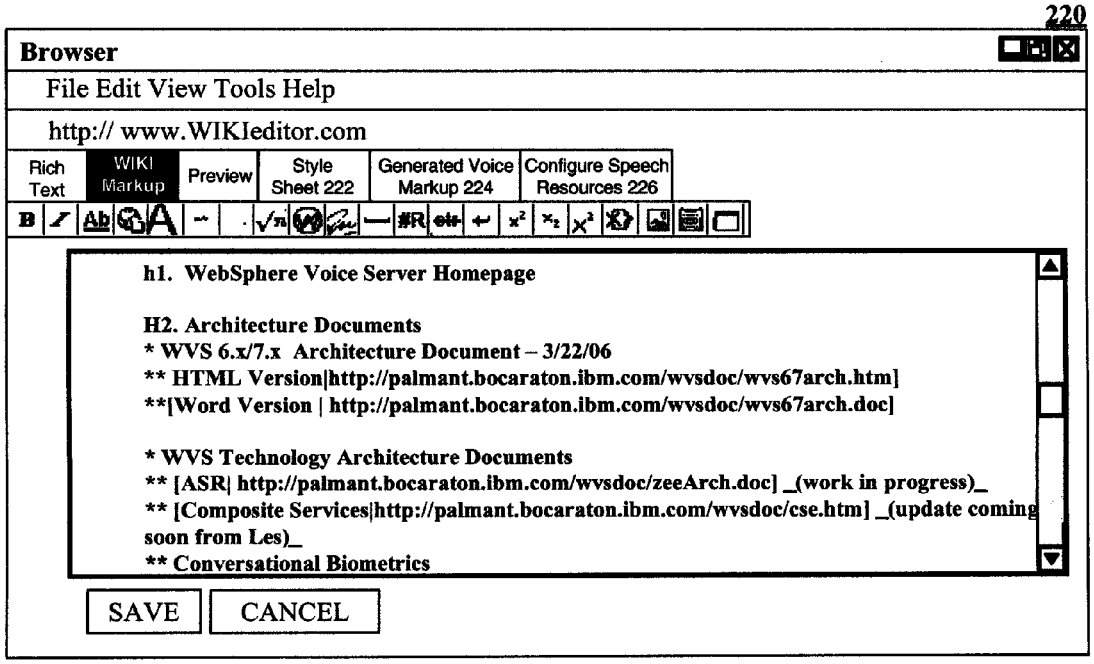
Figure 2B:
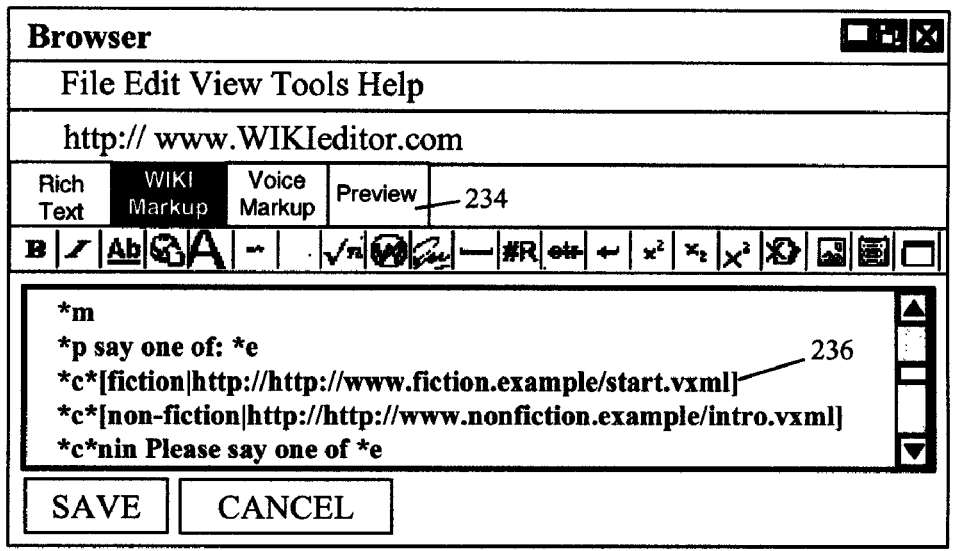
Figure 2B:
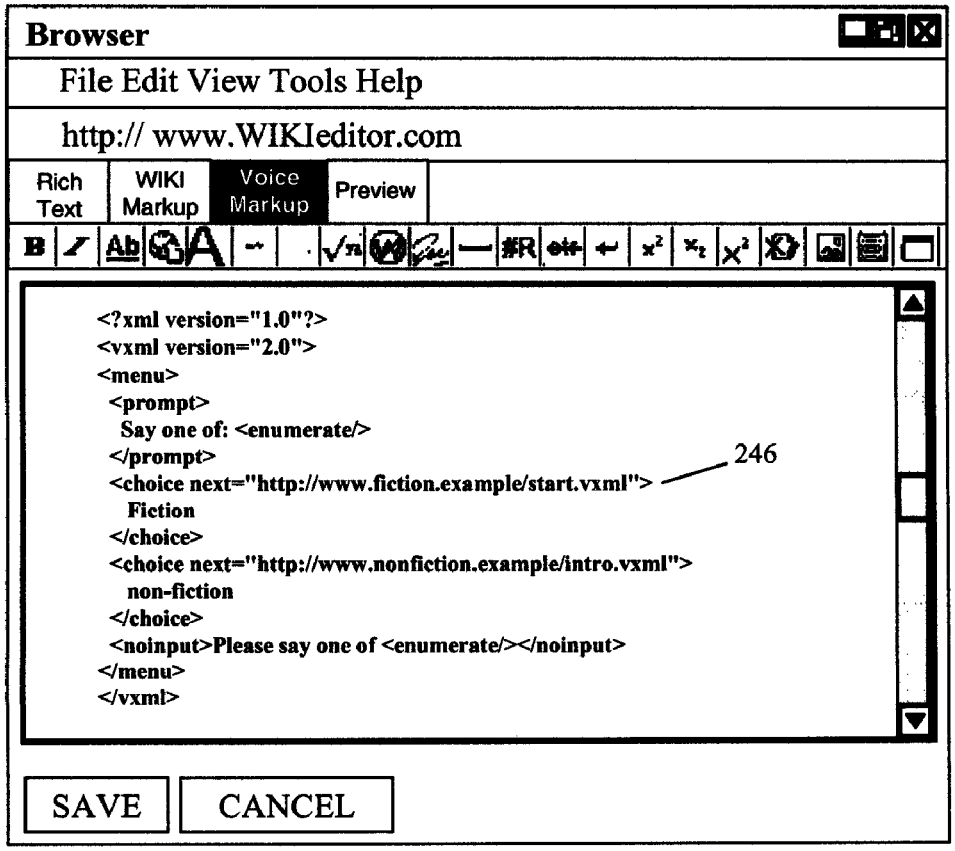

FIG. 2, which includes FIG. 2A and FIG. 2B, illustrates a WIKI editor for constructing speech-enabled applications in accordance with an embodiment of the inventive arrangements disclosed herein. More specifically, GUI 210 illustrates a preview of a WIKI application specified by WIKI syntax code shown in GUI 220. GUI 230 illustrates an editor interface that includes WIKI syntax extended for voice, which is automatically converted by the WIKI editor into VoiceXML code shown in GUI 240. The GUIs 210-240 can be user-facing interfaces of the WIKI editor 116 shown in FIG. 1.

More specifically, FIG. 2A shows a WIKI page in GUI 210 that is constructed with a WIKI editor using WIKI syntax. The WIKI page is visually presented responsive to a user selecting a preview tab 212 of the associated WIKI editor, which is rendered in a Web browser. The content presented in the home page corresponds to content specified by WIKI syntax, as shown in GUI 220. For example, WIKI syntax "h1. WebSphere Voice Server Homepage" shown in GUI 220 corresponds to the title "WebSphere Voice Server Homepage" shown in GUI 210.

GUI 220 includes a number of different tabs, such as a rich text tab, a WIKI markup tab, a preview tab, a style sheet tab 222, a generated voice markup tab 224, and a configure speech resources tab 226. It should be appreciated that the WIKI markup shown in GUI 220 is written in a normal WIKI syntax. This normal syntax can be dynamically converted into a voice format, such as shown by the steps 140-148 of FIG. 1. The style sheet tab 222 can permit a user to specify details of a style sheet used to transform the normal WIKI syntax into a voice markup format. Selection of the generated voice markup tab 224 can cause voice markup, such as VoiceXML markup, to be automatically generated from the WIKI markup in accordance with a style sheet specified by tab 222.

Additionally, the configure speech resources tab 226 can present a set of user configurable options relating to speech processing operations. The options displayed responsive to a selection of tab 226 can permit a user to customize which speech resources are available to the WIKI entry, speech processing characteristics (e.g., language, grammar, voice attributes such as name or gender), result characteristics (e.g., results synchronous or asynchronous, real-time or batch processed results), a media location and type for input/output, and other such settings.

FIG. 2B shows WIKI markup extended for voice in GUI 230, which is converted into VoiceXML markup as shown in GUI 240. This creation of a speech-enabled application using WIKI markup extended for voice can be performed in accordance with steps 150-154 of FIG. 1. In GUIs 230 and 240, standard WIKI editor buttons can be overloaded to provide additional functionality for speech. For example, a preview tab 234 of GUI 230 can cause created voice markup to be audibly rendered, so that a user can test their speech-enabled WIKI entry. In one embodiment, this audible rendering can use AJAX, which is accessible via browser plug-ins to establish audible communication pathways between the browser and a server-side speech processing system, which performs speech processing tasks for the WIKI entry. In one embodiment, the extended WIKI syntax of GUI 230 can re-use syntax characteristics for HTML. For example, a link notation of [link name|actual http link] can be used for VoiceXML links, as shown by entry WIKI markup 236 that corresponds to VoiceXML markup entry 246.

Figure 3:
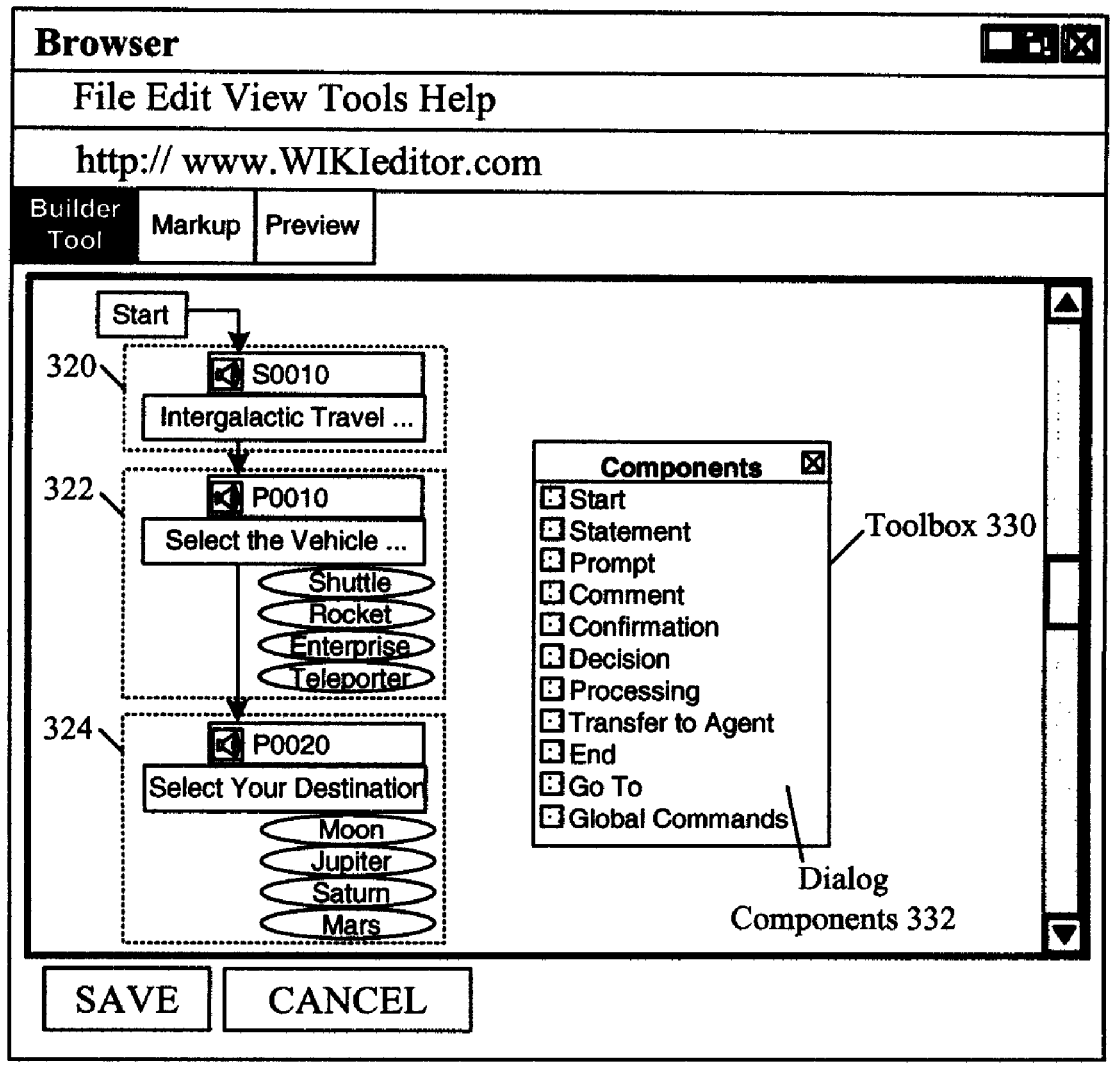
FIG. 3 illustrates a WIKI editor for constructing speech-enabled applications using a graphical builder tool in accordance with an embodiment of the inventive arrangements disclosed herein.

FIG. 3 illustrates a WIKI editor for constructing speech-enabled applications using a graphical builder tool in accordance with an embodiment of the inventive arrangements disclosed herein. A GUI 310 of FIG. 3 can be one embodiment of a user-facing interface of the WIKI editor 116 shown in FIG. 1. That is, the GUI 310 can represent a sample interface associated with steps 160-168 of FIG. 1.

The GUI 310 can provide a number of visual software development tools 330 to the user, which can be arranged on a development canvas. The tools 330 can include dialog construction components 332 including, but not limited to, components for start, statements, prompts, comments, configuration, decision, processing, transfer to an agent, end, goto, global commands, and the like. The canvas can be used to create and link multiple WIKI entries 320, 322, and 324. Each entry 320, 322, and 324 can be a speech-enabled WIKI page. For example, the entry 322 can include a dialog prompt for selecting a vehicle and a speech recognition grammar including entries for shuttle, rocket, enterprise, and teleporter.

The builder tool of GUI 310 can be a full-featured voice development environment served by a WIKI server and presented within a Web browser. The builder tool can include, for example, a graphical call building component, a VoiceXML development and debugging component, a grammar development and debugging component, a pronunciation builder component, a Call Control Extensible Markup Language (CCXML) development component, a speech resource configuration tool, and the like.

It should be appreciated that the GUIs 210-240 and 310 are provided for illustrative purposes only and that the interface of the disclosed WIKI editor is not to be limited to precise arrangements shown therein. That is, the GUIs 210-240 and 310 represent contemplated embodiments of general concepts of a WIKI editor for creating/editing speech enabled applications, which can be situationally adapted as desired. That is, graphical elements, menu options, toolbars, tabs, pop-up windows, configuration options and the like of a WIKI editor for voice can be implemented in any sensible manner and not necessarily in accordance with specific elements illustrated in the sample GUIs 210-240 and 310.

Figure 4:
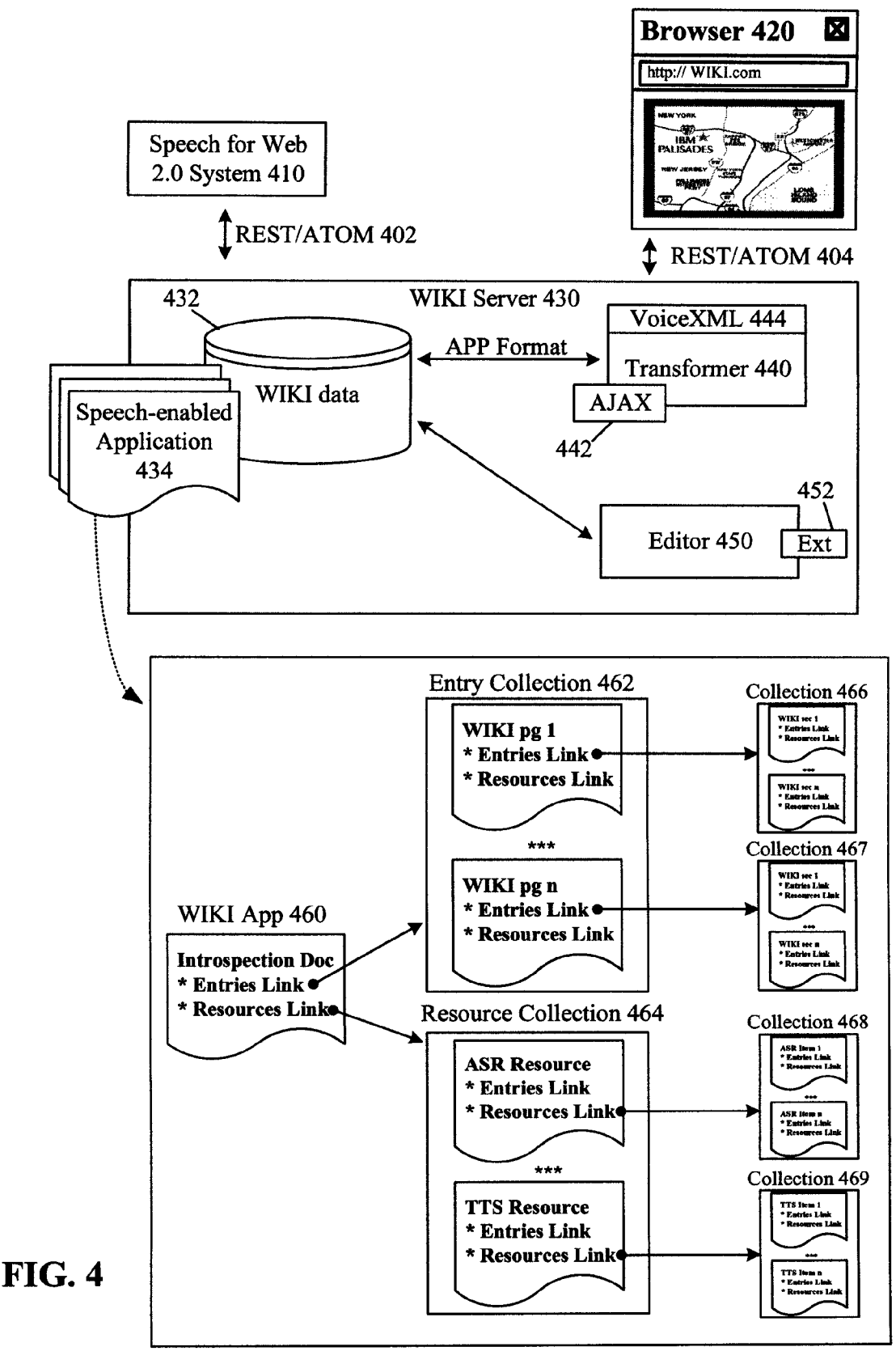
FIG. 4 is a schematic diagram showing a WIKI editor in accordance with an embodiment of the inventive arrangements disclosed herein.

FIG. 4 is a schematic diagram showing a WIKI editor 450 in accordance with an embodiment of the inventive arrangements disclosed herein. The WIKI editor 450 can be utilized to create speech-enabled applications 434, which are formatted in accordance with a RESTful protocol, such as APP. Speech processing capabilities of the speech-enabled applications 434 can be provided by a speech for Web 2.0 system 410. End-user interactions with a WIKI server 430 associated with the editor 450 can occur through a standard browser 420.

In system 400, a browser 420 can communicate with Web 2.0 server 430 via Representational State Transfer (REST) architecture/ATOM 404 based protocol. The Web 2.0 server 430 can communicate with a speech for Web 2.0 system 410 via a REST/ATOM 402 based protocol. Protocols 402, 404 can include HTTP and similar protocols that are RESTful by nature as well as an Atom Publishing Protocol (APP) or other protocol that is specifically designed to conform to REST principles.

The Web 2.0 server 430 can include a data store 432 in which applications 434, which can be speech-enabled, are stored. In one embodiment, the applications 432 can be written in a WIKI or other Web 2.0 syntax and can be stored in an APP format.

The speech enabled application 434 can be accessed via an introspection document 460, per the APP protocol. The application can contain a collection of entries 462 and resources 464. The entries 462 can specify a set of WIKI pages. Each WIKI page (entry 462) can be further decomposed into collections 466-467 having a lower level of granularity, such as WIKI page sections. The resources 464 can include speech processing resources and their particulars, such as ASR resources, TTS resources, SIV resources, VXML interpreter resources, and the like. Each resource 464 can be further decomposed into configurable resource specifics 468-469, such as a speech recognition grammar (for a related WIKI page), a recognition language, and the like. The speech application elements 460-469, can be introspected, customized, replaced, added, re-ordered, or removed by an end-user utilizing browser 420 using editor 450. The editor 450 can be a standard WIKI editor having a voice plug-in or extensions 452.

The transformer 440 can convert WIKI or other Web 2.0 syntax into standard markup for browsers. In one embodiment, the transformer 440 can be an extension of a conventional transformer that supports HTML and XML. The extended transformer 440 can be enhanced to handle JAVA SCRIPT, such as AJAX. For example, resource links of application 432 can be converted into AJAX functions by the transformer 440 having an AJAX plug-in 442. The transformer 440 can also include a VoiceXML plug-in 444, which generates VoiceXML markup for voice-only clients.

Figure 5:
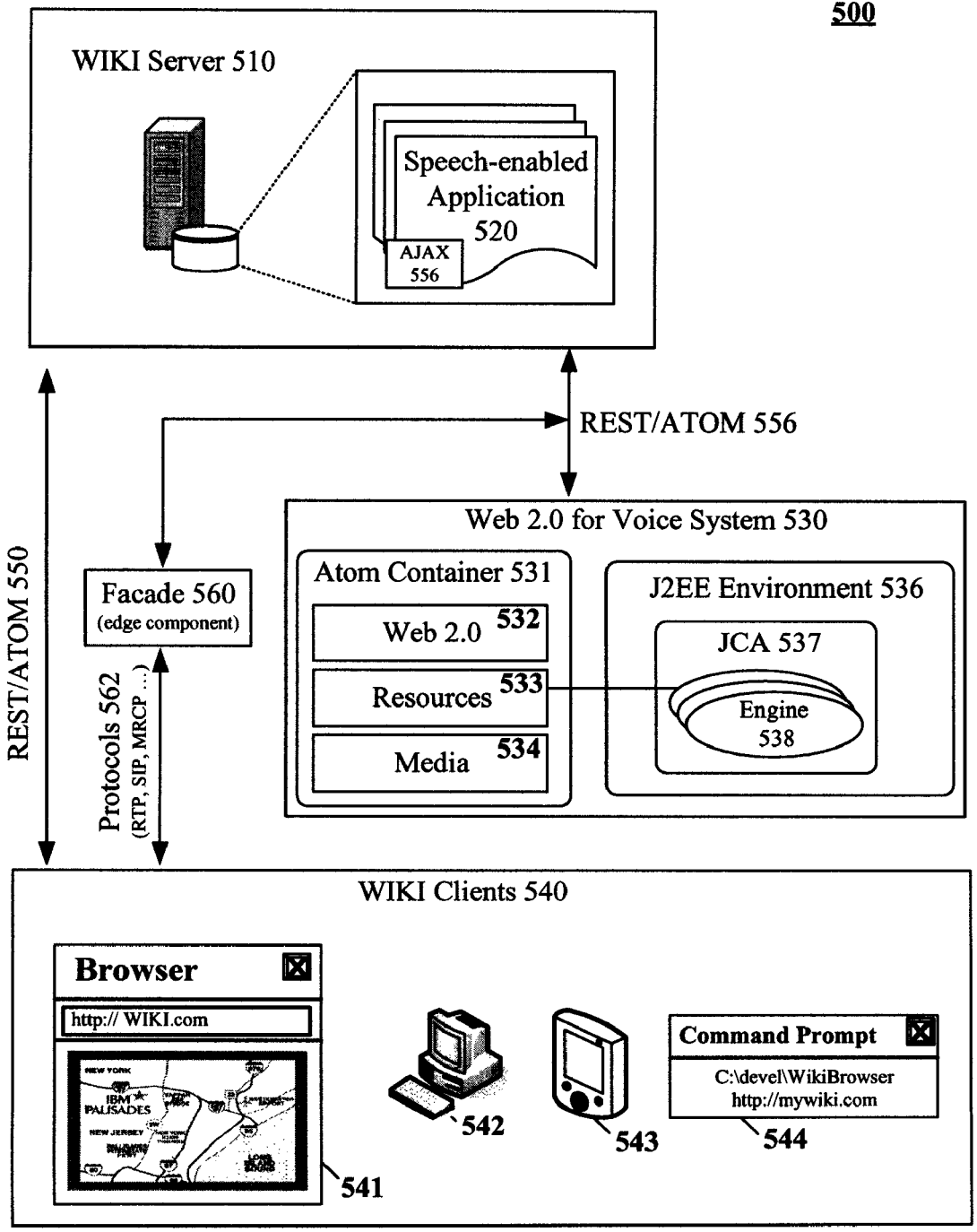
FIG. 5 is a schematic diagram of a Web 2.0 for voice system in which end-users are able to create/edit speech-enabled WIKIs in accordance with an embodiment of the inventive arrangements disclosed herein.

FIG. 5 is a schematic diagram of a Web 2.0 for voice system 530 in which end-users are able to create/edit speech-enabled WIKIs in accordance with an embodiment of the inventive arrangements disclosed herein. A system 500 in which the system 530 is illustrated can be one embodiment of system 100. That is, system 500 illustrates details of one implementation of the system 410 described in FIG. 4.

In system 500, Web 2.0 clients 540 can communicate with WIKI server 510 utilizing a REST/ATOM 550 protocol. The WIKI server 510 can serve one or more speech-enabled applications 520, where speech resources are provided by a Web 2.0 for Voice system 530. One or more of the applications 520 can include AJAX 556 or other JavaScript code. In one embodiment, the AJAX 556 code can be automatically converted from WIKI or other syntax by a transformer of server 510.

Communications between the WIKI server 510 and system 530 can be in accordance with REST/ATOM 556 protocols. Each speech-enabled application 520 can be associated with an ATOM container 531, which specifies Web 2.0 items 532, resources 533, and media 534. One or more resource 533 can correspond to a speech engine 538.

The Web 2.0 clients 540 can be any client capable of interfacing with WIKI server 510. For example, the clients 540 can include a Web or voice browser 541 as well as any other type of interface 544, which executes upon a computing device. The computing device can include a mobile telephone 542, a mobile computer 543, a laptop, a media player, a desktop computer, a two-way radio, a line-based phone, and the like. Unlike conventional speech clients, the clients 540 need not have a speech-specific interface and instead only require a standard Web 2.0 interface. That is, there are no assumptions regarding the client 540 other than an ability to communicate with a WIKI 2.0 server 510 using WIKI conventions.

The Web 2.0 for voice system 530 can utilize Web 2.0 concepts to provide speech capabilities. A server-side interface is established between the voice system 530 and a WIKI server 510. Available speech resources can be introspected and discovered via introspection documents, which are one of the Web 2.0 items 532. Introspection can be in accordance with the APP specification or a similar protocol. The ability for dynamic configuration and installation is exposed to the server 510 via the introspection document.

That is, access to Web 2.0 for voice system 530 can be through a Web 2.0 server that lets users (e.g., clients 540) provide their own customizations/personalizations. Appreciably, use of the APP 556 opens up the application interface to speech resources using Web 2.0, JAVA 2 ENTERPRISE EDITION (J2EE), WEBSPHERE APPLICATION SERVER (WAS), and other conventions, rather than being restricted to protocols, such as media resource control protocol (MRCP), real time streaming protocol (RTSP), or real time protocol (RTP).

A constrained set of RESTful commands can be used to interface with the Web 2.0 for voice system 530. RESTful commands can include a GET command, a POST command, a PUT command, and a DELETE command, each of which is able to be implemented as an HTTP command. As applied to speech, GET (e.g., HTTP GET) can return capabilities and elements that are modifiable. The GET command can also be used for submitting simplistic speech queries and for receiving query results.

The POST command can create media-related resources using speech engines 538. For example, the POST command can create an audio "file" from input text using a text-to-speech (TTS) resource 533 which is linked to a TTS engine 538. The POST command can create a text representation given an audio input, using an automatic speech recognition (ASR) resource 533 which is linked to an ASR engine 538. The POST command can create a score given an audio input, using a Speaker Identification and Verification (SIV) resource which is linked to a SIV engine 538. Any type of speech processing resource can be similarly accessed using the POST command.

The PUT command can be used to update configuration of speech resources (e.g., default voice-name, ASR or TTS language, TTS voice, media destination, media delivery type, etc.) The PUT command can also be used to add a resource or capability to a WIKI server 510 (e.g. installing an SIV component). The DELETE command can remove a speech resource from a configuration. For example, the DELETE command can be used to uninstall a previously installed speech component.

The Web 2.0 for Voice system 530 is an extremely flexible solution that permits users (of clients 540) to customize numerous speech processing elements. Customizable speech processing elements can include speech resource availability, request characteristics, result characteristics, media characteristics, and the like. Speech resource availability can indicate whether a specific type of resource (e.g., ASR, TTS, SIV, Voice XML interpreter) is available. Request characteristics can refer to characteristics such as language, grammar, voice attributes, gender, rate of speech, and the like. The result characteristics can specify whether results are to be delivered synchronously or asynchronously. Result characteristics can alternatively indicate whether a listener for callback is to be supplied with results. Media characteristics can include input and output characteristics, which can vary from a URI reference to an RTP stream. The media characteristics can specify a codec (e.g., G711), a sample rate (e.g., 8 KHz to 22 KHz), and the like. In one configuration, the speech engines 538 can be provided from a J2EE environment 536, such as a WAS environment. This environment 536 can conform to a J2EE Connector Architecture (JCA) 537.

In one embodiment, a set of additional facades 560 can be utilized on top of Web 2.0 protocols to provide additional interface and protocol 562 options (e.g., MRCP, RTSP, RTP, Session Initiation Protocol (SIP), etc.) to the Web 2.0 for voice system 530. Use of facades 560 can enable legacy access/use of the Web 2.0 for voice system 530. The facades 560 can be designed to segment the protocol 562 from underlying details so that characteristics of the facade do not bleed through to speech implementation details. Functions, such as the WAS 6.1 channel framework or a JCA container, can be used to plug-in a protocol, which is not native to the J2EE environment 536. The media component 534 of the container 531 can be used to handle media storage, delivery, and format conversions as necessary. Facades 560 can be used for asynchronous or synchronous protocols 562.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for creating and editing speech-enabled WIKIs comprising:
    a WIKI editor configured to be served to client-side Web browsers, wherein said WIKI editor is configured to permit users to create and edit speech-enabled WIKI applications; and
    a WIKI server configured to serve speech-enabled WIKI applications created via the WIKI editor, wherein each of the speech-enabled WIKI applications include a link to at least one speech processing engine located in a speech processing system remote from the WIKI server, said speech processing engine providing a speech processing capability for the speech-enabled WIKI application when served by the WIKI server.

2. The system of claim 1, wherein each of said speech-enabled WIKI applications comprise a set of linked documents including an introspection document, an entry collection of documents, and a resource collection of documents, and wherein one of the documents in the resource collection is a speech resource document, and wherein the speech processing engine corresponds to the speech resource document and is activated responsive to details contained within the speech resource document.

3. The system of claim 2, wherein the WIKI editor is configured to permit end-users to introspect, customize, replace, add, re-order, and remove entries and resources in the collections.

4. The system of claim 1, wherein each of the speech-enabled applications is written in an ATOM PUBLISHING PROTOCOL (APP) compliant format, and wherein each of the speech-enabled applications communicates with the speech processing engine using a set of RESTful commands, wherein said set of RESTful commands comprises an HTTP GET command, an HTTP POST command, an HTTP PUT command, and an HTTP DELETE command.

5. The system of claim 1, further comprising:
    a syntax transformer configured to transform WIKI syntax entered via the WIKI editor into a voice markup language, wherein speech-enabled applications served by the WIKI server are formatted in the voice markup language.

6. The system of claim 5, wherein the syntax transformer is configured to transform normal WIKI syntax into the voice markup language in accordance with at least one configurable style sheet.

7. The system of claim 5, wherein the syntax transformer is configured to transform enhanced WIKI syntax extended for voice into the voice markup language.

8. The system of claim 5, wherein the syntax transformer is configured to transform normal WIKI syntax into VoiceXML at runtime.

9. The system of claim 1, wherein said server-side WIKI editor further comprises:
    a graphical software development tool consisting of a flow builder that includes a canvas upon which dialog components from a toolbox are able to be arranged to visually create the speech-enabled WIKI applications.

10. The system of claim 1, wherein the server-side WIKI editor further comprises a preview option for the speech-enabled application, wherein a selection of the preview option audibly renders a current one of the speech-enabled applications to a user of one of the client-side Web browsers, whereby the user is able to test speech-enabled applications developed using the WIKI editor by selecting the preview option.

11. A method for creating and editing speech-enabled WIKIs comprising:
    serving a WIKI editor to client-side Web browsers, wherein said WIKI editor permits users to create and edit speech-enabled WIKI applications; and
    a WIKI server serving speech-enabled WIKI applications created via the WIKI editor, wherein each of the speech-enabled WIKI applications include a link to at least one speech processing engine located in a speech processing system remote from the WIKI server, said speech processing engine providing a speech processing capability for the speech-enabled WIKI application when served by the WIKI server.

12. The method of claim 11, wherein each of said speech-enabled WIKI applications comprise a set of linked documents including an introspection document, an entry collection of documents, and a resource collection of documents, and wherein one of the documents in the resource collection is a speech resource document, and wherein the speech processing engine corresponds to the speech resource document and is activated responsive to details contained within the speech resource document.

13. The method of claim 12, wherein the WIKI editor is configured to permit end-users to introspect, customize, replace, add, re-order, and remove entries and resources in the collections.

14. The method of claim 11, wherein each of the speech-enabled applications is written in an ATOM PUBLISHING PROTOCOL (APP) compliant format, and wherein each of the speech-enabled applications communicates with the speech processing engine using a set of RESTful commands, wherein said set of RESTful commands comprises an HTTP GET command, an HTTP POST command, an HTTP PUT command, and an HTTP DELETE command.

15. A non-transitory storage medium comprising a computer program product to cause a system having an information processing capability to perform a set of functions when the system executes the computer program product, wherein execution of the computer program product causes the system to:
    serve a WIKI editor to client-side Web browsers, wherein said WIKI editor permits users to create and edit speech-enabled WIKI applications; and
    serve, via a WIKI server, speech-enabled WIKI applications created via the WIKI editor, wherein each of the speech-enabled WIKI applications include a link to at least one speech processing engine located in a speech processing system remote from the WIKI server, said speech processing engine providing a speech processing capability for the speech-enabled WIKI application when served by the WIKI server.

16. The non-transitory storage medium of claim 15, wherein each of said speech-enabled WIKI applications comprise a set of linked documents including an introspection document, an entry collection of documents, and a resource collection of documents, and wherein one of the documents in the resource collection is a speech resource document, and wherein the speech processing engine corresponds to the speech resource document and is activated responsive to details contained within the speech resource document.

17. The non-transitory storage medium of claim 15, wherein the WIKI editor is configured to permit end-users to introspect, customize, replace, add, re-order, and remove entries and resources in the collections.

18. The non-transitory storage medium of claim 15, wherein each of the speech-enabled applications is written in an ATOM PUBLISHING PROTOCOL (APP) compliant format, and wherein each of the speech-enabled applications communicates with the speech processing engine using a set of RESTful commands, wherein said set of RESTful commands comprises an HTTP GET command, an HTTP POST command, an HTTP PUT command, and an HTTP DELETE command.

* * * * *